(12) United States Patent
Chen et al.

(10) Patent No.: US 9,553,897 B2
(45) Date of Patent: Jan. 24, 2017

(54) METHOD AND COMPUTER DEVICE FOR MONITORING WIRELESS NETWORK

(71) Applicant: Tencent Technology (Shenzhen) Company Limited, Shenzen (CN)

(72) Inventors: Ke Chen, Shenzhen (CN); Xi Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 81 days.

(21) Appl. No.: 14/731,313

(22) Filed: Jun. 4, 2015

(65) Prior Publication Data

US 2015/0295953 A1 Oct. 15, 2015

Related U.S. Application Data

(63) Continuation of application No. PCT/CN2013/088132, filed on Nov. 29, 2013.

(30) Foreign Application Priority Data

Dec. 5, 2012 (CN) .......................... 2012 1 0516168

(51) Int. Cl.
*H04L 29/06* (2006.01)
*G06F 21/00* (2013.01)
(Continued)

(52) U.S. Cl.
CPC .............. *H04L 63/20* (2013.01); *H04L 43/10* (2013.01); *H04L 61/2007* (2013.01);
(Continued)

(58) Field of Classification Search
CPC ...... H04L 63/20; H04L 43/10; H04L 67/1095; H04L 61/6068; H04L 61/2007; H04W 12/02

See application file for complete search history.

(56) References Cited

U.S. PATENT DOCUMENTS 7,542,468 B1 * 6/2009 Begley ................ H04L 61/2015
370/389
2004/0107219 A1 * 6/2004 Rosenberger ....... H04L 12/2602
(Continued)

FOREIGN PATENT DOCUMENTS

CN 1717095 1/2006
CN 102075927 5/2011
(Continued)

OTHER PUBLICATIONS

International Preliminary Report on Patentability, dated Jun. 9, 2015, Application No. PCT/CN2013/088132.
(Continued)

*Primary Examiner* — Lisa Lewis
(74) *Attorney, Agent, or Firm* — Blakely Sokoloff Taylor & Zafman LLP

(57) ABSTRACT

The present disclosure discloses a method and computer device for monitoring a wireless network. The method is implemented as follows. The computer device obtains configuration file information for accessing the wireless network after the computer device accesses the wireless network, wherein the configuration file information comprises an IP address and a subnet mask of the computer device. The computer device calculates an IP address range of the wireless network according to the IP address and the subnet mask of the computer device. The computer device searches for a device that accesses the wireless network and of which IP address is within the IP address range.

14 Claims, 4 Drawing Sheets

(51) Int. Cl.
*H04L 12/26* (2006.01)
*H04L 29/12* (2006.01)
*H04L 29/08* (2006.01)
*H04W 12/02* (2009.01)

(52) U.S. Cl.
CPC ...... *H04L 61/6068* (2013.01); *H04L 67/1095* (2013.01); *H04W 12/02* (2013.01)

(56) References Cited

U.S. PATENT DOCUMENTS

| | | | | |
|---|---|---|---|---|
| 2004/0120260 | A1* | 6/2004 | Bernier | H04L 61/2015 370/252 |
| 2007/0156898 | A1* | 7/2007 | Appleby | H04L 63/10 709/225 |
| 2007/0180109 | A1* | 8/2007 | Brim | H04L 63/1433 709/225 |
| 2007/0198671 | A1* | 8/2007 | Motoyama | G08C 17/02 709/222 |
| 2008/0134300 | A1 | 6/2008 | Izatt | |
| 2009/0281676 | A1* | 11/2009 | Beavis | G06F 1/266 700/295 |
| 2012/0182877 | A1* | 7/2012 | Swaminathan | H04W 24/00 370/242 |

FOREIGN PATENT DOCUMENTS

| | | |
|---|---|---|
| CN | 102316457 | 1/2012 |
| CN | 102523210 | 6/2012 |

OTHER PUBLICATIONS

Chinese Office Action, dated Apr. 22, 2016, Chinese Application No. 201210516168.9.
International Search Report for International Application No. PCT/CN2013/088132, mailed Mar. 6, 2014.

* cited by examiner

METHOD AND COMPUTER DEVICE FOR MONITORING WIRELESS NETWORK

This application is a continuation of International Application No. PCT/CN2013/088132, filed on Nov. 29, 2013. This application claims the benefit and priority of Chinese Patent Application No. 201210516168.9, filed on Dec. 5, 2012. The entire disclosures of each of the above applications are incorporated herein by reference.

TECHNICAL FIELD

The present disclosure relates to wireless communication technologies, and more particularly to a method and computer device for monitoring a wireless network.

BACKGROUND

With the rapid development of Internet technologies, the number of Internet users is increased greatly. Since mobile devices with a wireless fidelity (WIFI) function, such as mobile phones and laptops, are popular and easy to carry, more and more users would like to access the Internet through a wireless mode. The users may access the Internet through wireless routers at home, in school dorm as well as various consumption concourses, which satisfies the demands of users on mobile entertainment and mobile office, but brings new problems.

Signals of wireless router are visual in a certain space for all devices accessing the Internet through the wireless mode. Accordingly, a device cannot be connected to the wireless router unless the device passes a key certification. At present, multiple encryption algorithms may be selected for a certification process. However, some encryption algorithms are not secure enough. For those unsecure encryption algorithms, a device called wifi password breaker is provided. Such device has a signal emission source with large power, and thus may find surrounding wireless networks. If an encryption algorithm used by a wireless network is not secure enough, the device may decrypt the wireless network easily. Once the wireless network is decrypted, some users loving small gain may access the Internet without paying Internet access fee. In this case, those users paying Internet access fee may suffer losses. However, those users paying Internet access fee may be unknown of the losses because they are ignorant of wireless network knowledge.

At present, most home wireless routers may provide a Media Access Control (MAC) address bundling/filtering function. A user may open a router management interface, start the MAC address filtering function, and inputs a MAC address of a legal device. In this way, the wireless router may allow the legal device to access the Internet, and reject access requests of other devices, thereby preventing other devices from accessing the Internet without paying Internet access fee. Herein, a device allowed to access the Internet is called the legal device.

However, if a user wants to use the MAC address filtering function, the user is required to have computer system knowledge. The user is required to obtain a MAC address of each legal device, and configure the MAC address on an advanced management page of the wireless router. These operations are complex for most common users, and thus are difficult to be implemented.

Some home advanced wireless routers may provide a Wi-Fi Protected Setup (WPS) function. Through the WPS function, a Service Set Identifier (SSID) and a Wi-Fi Protected Access (WPA) security key may be configured automatically. Without needing to comprehend the SSID and the security key, a common user may access the Internet securely through inputting a simple Personal Identification Number (PIN) or pressing a button. Moreover, because the security key is generated randomly, it is impossible to decrypt the security key. Further, the user does not need to remember a redundant key, thereby avoiding the bother of key loss.

If a WPS certification mode is used, the configuration and encryption of wireless network may be simplified. However, if the WPS certification mode is used, a wireless access point and a client device must pass the WPS certification. Herein, the wireless access point may be a wireless router, and the client device may be a wireless network card. If any one of the wireless access point and the client device does not pass the WPS certification, the WPS function cannot be implemented. Moreover, because devices provided by different manufacturers may be different, the wireless access point and the client device provided by different manufacturers respectively may be incompatible. At present, most wireless network cards do not follow a WPS standard. Moreover, because of high costs, most users do not select WPS wireless routers. Accordingly, the application scope of WPS wireless routers is limited, and thus it is difficult to prevent other users from accessing the Internet without paying Internet access fee.

SUMMARY OF THE INVENTION

Examples of the present disclosure provide a method and computer device for monitoring a wireless network, thereby preventing an uncertified device from accessing the wireless network.

A method for monitoring a wireless network includes:

obtaining, by a computer device, configuration file information for accessing the wireless network after the computer device accesses the wireless network, wherein the configuration file information comprises an Internet Protocol (IP) address and a subnet mask of the computer device;

calculating, by the computer device, an IP address range of the wireless network according to the IP address and the subnet mask of the computer device; and searching for, by the computer device, a device that accesses the wireless network and of which IP address is within the IP address range.

A computer device for monitoring a wireless network includes:

an obtaining unit, configured to obtain configuration file information for accessing the wireless network after the computer device accesses the wireless network, wherein the configuration file information comprises an Internet Protocol (IP) address and a subnet mask of the computer device;

a calculating unit, configured to calculate an IP address range of the wireless network according to the IP address and the subnet mask of the computer device; and a searching unit, configure to search for a device that accesses the wireless network and of which IP address is within the IP address range.

By the above solution, a user may learn whether an uncertified device accesses the wireless network. If an uncertified device accesses the wireless network, the user may take an action to prevent the uncertified device from occupying the wireless network.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Examples of the present disclosure provide a method and computer device for monitoring a wireless network, thereby preventing an uncertified device from accessing the wireless network.

Figure 1:
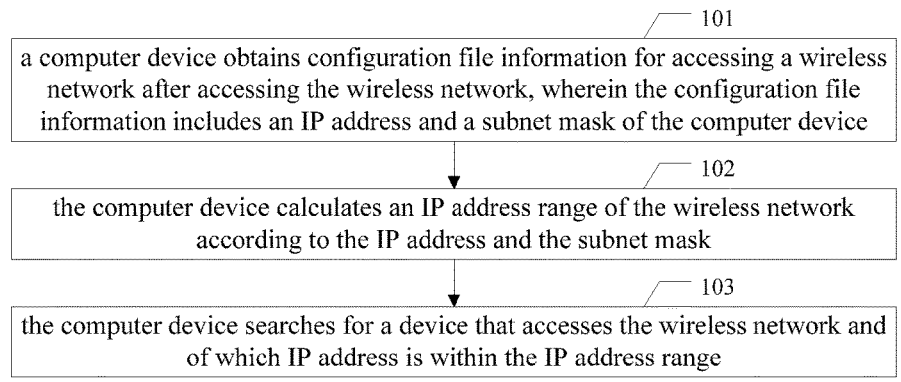
FIG. 1 is a schematic flowchart illustrating a method for monitoring a wireless network according to an example of the present disclosure.

FIG. 1 is a schematic flowchart illustrating a method for monitoring a wireless network according to an example of the present disclosure. Referring to FIG. 1, the method includes following blocks.

At block 101, a computer device obtains configuration file information for accessing a wireless network after accessing the wireless network, wherein the configuration file information includes an IP address and a subnet mask of the computer device.

In an example, the wireless network may be a wireless local network. For convenience, the wireless local network is taken as an example in the following description.

In an implementation, the computer device may obtain configuration file information corresponding to a local network card after accessing the wireless local network. The configuration file information includes necessary configuration parameters for accessing the wireless local network by the computer device. The configuration file information includes the IP address and the subnet mask of the computer device. The physical address of the local network card, the IP address and the subnet mask are corresponding to each other.

At block 102, the computer device calculates an IP address range of the wireless network according to the IP address and the subnet mask.

At block 103, the computer device searches for a device that accesses the wireless network and of which IP address is within the IP address range.

In an example, after finding the device that accesses the wireless local network and of which IP address is within the IP address range, the computer device may obtain, through a PING asynchronism calling mode, the identification of the device that accesses the wireless local network and of which IP address is within the IP address range, and presents the identification of the device to a user. The user may determine, according to the identification of the device, whether the device is not certified to access the wireless local network. The identification of the device may include the name or MAC address of the device.

After finding all devices accessing the wireless local network, the computer device may present identifications of these devices to the user. In this way, the user may determine, according to the identifications, whether an uncertified device accesses the wireless local network.

By the example of the present disclosure, the user may learn whether an uncertified device accesses the wireless local network. If an uncertified device accesses the wireless local network, the user may take an action to prevent the uncertified device from occupying the wireless local network.

Figure 2:
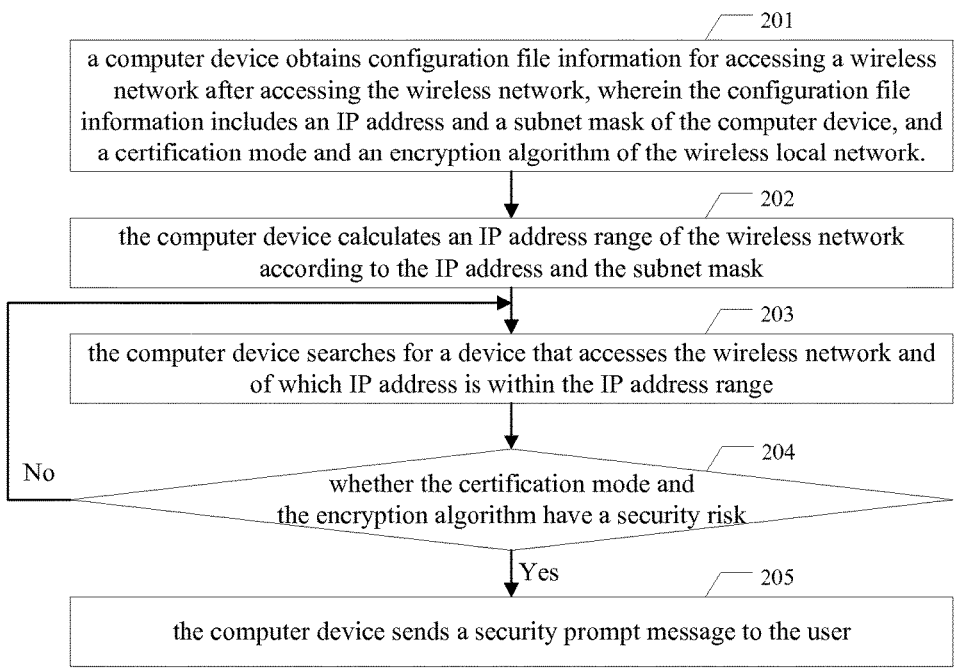
FIG. 2 is a schematic flowchart illustrating a method for monitoring a wireless network according to another example of the present disclosure.

In an implementation, if a certification mode and an encryption algorithm configured for a wireless router are too simple, a wireless access password may be easy to be decoded. Accordingly, an example of the present disclosure provides a solution for detecting the security of the certification mode and the encryption algorithm, referring to FIG. 2. FIG. 2 is a schematic flowchart illustrating a method for monitoring a wireless network according to another example of the present disclosure. As shown in FIG. 2, the method includes following blocks.

At block 201, a computer device obtains configuration file information for accessing a wireless network after accessing the wireless network, wherein the configuration file information includes an IP address and a subnet mask of the computer device, and a certification mode and an encryption algorithm of the wireless local network.

In an example, the wireless network may be a wireless local network. For convenience, the wireless local network is taken as an example in the following description.

In an implementation, the computer device may obtain configuration file information corresponding to a local network card after accessing the wireless local network. The configuration file information includes necessary configuration parameters for accessing the wireless local network by the computer device. The configuration file information usually includes the IP address and the subnet mask of the computer device, the name, the certification mode, the encryption algorithm, the gateway address and the signal strength of the wireless local network. The physical address of the local network card, the IP address and the subnet mask are corresponding to each other.

At block 202, the computer device calculates an IP address range of the wireless network according to the IP address and the subnet mask.

At block 203, the computer device searches for a device that accesses the wireless network and of which IP address is within the IP address range.

In an example, the computer device may obtain, through a PING asynchronism calling mode, the identification of the device that accesses the wireless local network and of which IP address is within the IP address range. The identification of the device may include the name or MAC address of the device.

After finding all devices accessing the wireless local network, the computer device may present identifications of these devices to a user. In this way, the user may determine, according to the identifications, whether an uncertified device accesses the wireless local network.

At block 204, the computer detects whether the certification mode and the encryption algorithm have a security risk. If the certification mode and the encryption algorithm have a security risk, block 205 is performed. If the certification mode and the encryption algorithm have no security risk, block 203 is performed.

At block 205, the computer device sends a security prompt message to the user.

In an example, the security prompt message may be a TIPS message.

In an example, the computer device may configure a blacklist according to conventional certification modes and encryption algorithms. Accordingly, the computer device may detect whether the certification mode and the encryption algorithm have a security risk through detecting whether the certification mode and the encryption algorithm of the wireless local network are in the blacklist. If the certification mode and the encryption algorithm of the wireless local network are in the blacklist, the computer device may determines that the certification mode and the encryption algorithm of the wireless network have a security risk, and send the security prompt message to the user.

Several conventional encryption algorithms are illustrated hereinafter.

Wired Equivalent Privacy (WEP) encryption algorithm is one of the data encryption algorithms. The WEP encryption algorithm is configured to provide a protection capability equal to a wired local network. The security technology of the WEP encryption algorithm is derived from a RSA data encryption technology named RC4, and is a necessary security protection layer of the wireless local network. At present, 64-bit WEP encryption algorithm and 128-bit WEP encryption algorithm are often used. In the WEP encryption algorithm, a static key is used to encrypt all communication data. That is, if a network manager intends to update the key, the network manager must access each host. Moreover, the RSA data encryption technology named RC4 may be forecasted, and thus an intruder is easy to intercept and decode the security key. Accordingly, the WEP encryption algorithm may be listed in the blacklist.

WPA protocol is configured to protect WiFi security. The WPA protocol is generated based on the WEP encryption algorithm, and overcomes the disadvantage of the WEP encryption algorithm. The WPA protocol uses Temporary Key Integrality Protocol (TKIP), and is a transition solution of IEEE 802.11i standard. WPA-PSK is usually used by a personal user. The security protection of the WPA protocol is more thorough than that of the WEP encryption algorithm. For example, identity certification, encryption mechanism and data packet detection of the WPA protocol are all more thorough that those of the WEP encryption algorithm. If the user requires a higher security level, the WPA protocol may also be listed in the blacklist.

WPA2 protocol is an update version of the WPA protocol. WPA2 protocol is a certification mode of IEEE 802.11i standard verified by the WiFi alliance. WPA2 protocol implements mandatory elements of 802.11i standard. Especially, Michael algorithm is substituted by information certification codes of Counter CBC-MAC Protocol (CCMP). The security of the CCMP has been accepted. RC4 encryption algorithm is also substituted by an Advanced Encryption Standard (AES).

WPA-PSK+WPA2-PSK protocol is a combination of the WPA protocol and the WPA2 protocol. WPA-PSK is also called WPA-Personal. WPA-PSK uses the TKIP to associate a device with a wireless access point. WPA2-PSK uses the AES to associate a device and a wireless access point.

After receiving the security prompt message, the user may reconfigure a wireless access password, and modifies the certification mode and the encryption algorithm. In an example, the user may manually select a new certification mode and a new encryption algorithm, or the computer device automatically selects the new certification mode and the new encryption algorithm for the user.

The computer device may push a security configuring interface for the user, so that the user reconfigures the wireless access password on the security configuring interface. According to the wireless access password configured by the user, the computer device selects the new certification mode and the new encryption algorithm for the user.

When determining that the certification mode and the encryption algorithm of the wireless local network have a security risk, the computer device prompts the user through the security prompt message to reconfigure a secure certification mode. During a conventional router configuration operation process, the user needs to log on a router manage page through a browser, find an encryption configuration option of wireless local network from various management contents and configure a security key in the encryption configuration option. These operations are too complex for a common user. An example of the present disclosure provides a simplified method for configuring the security key. In the method, a simple configuring interface is presented to the user. As long as the user inputs a management account and a password of the router, the user may configure the security key on a subsequent page. In an example, the computer device may determine whether the security key inputted by the user is complex enough. If the security key is not complex enough, the computer device prompts the user to input a more complex security key, and automatically selects a certification mode with a higher security level for the user, such as the WPA2-PSK and the AES. After the configuration, the computer device automatically obliges the router to restart, and prompts the user to access the wireless local network with the new security key.

In another example, block 203 may also be performed after blocks 204 and 205. Accordingly, the sequence of blocks 203, 204 and 205 may be determined according to actual requirements, which is not limited herein.

The method for automatically detecting the security level of the certification mode and the encryption algorithm may improve the security of the wireless local network, and effectively prevent the wireless access password from being decrypted.

Figure 3:
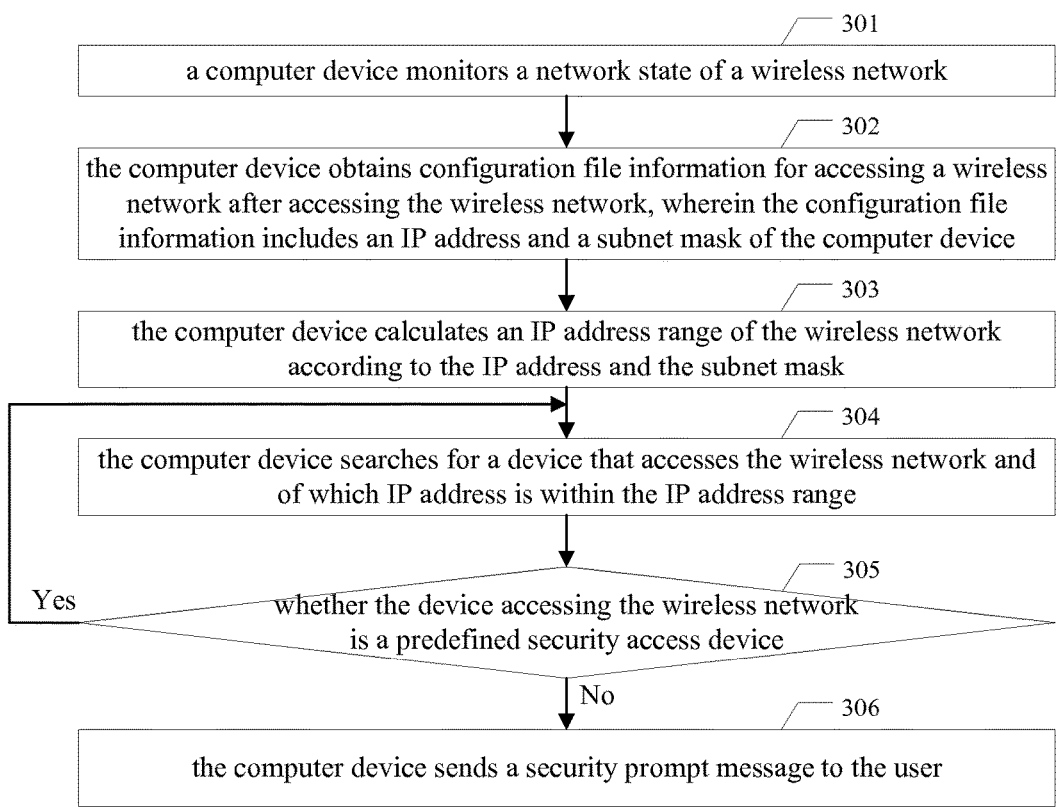
FIG. 3 is a schematic flowchart illustrating a method for monitoring a wireless network according to another example of the present disclosure.

In an implementation, the method for monitoring the wireless network may be configured as an automatically monitoring mode, referring to FIG. 3. Another method for monitoring the wireless network is provided according to another example of the present disclosure, which includes following blocks.

At block 301, a computer device monitors a network state of a wireless network.

In an example, the wireless network may be a wireless local network. For convenience, the wireless local network is taken as an example in the following description.

In an example, when the transmission speed of the wireless local network is unstable or is lower than a predefined threshold, block 302 may be performed.

At block 302, the computer device obtains configuration file information for accessing a wireless network after accessing the wireless network, wherein the configuration file information includes an IP address and a subnet mask of the computer device.

In an example, the configuration file information further includes a certification mode and an encryption algorithm of the wireless local network.

In an implementation, the computer device may obtain configuration file information corresponding to a local network card after accessing the wireless local network. The configuration file information includes necessary configuration parameters for accessing the wireless local network by the computer device. The configuration file information usually includes the IP address and the subnet mask of the computer device, the name, the certification mode, the encryption algorithm, the gateway address and the signal strength of the wireless local network. The physical address of the local network card, the IP address and the subnet mask are corresponding to each other.

At block 303, the computer device calculates an IP address range of the wireless network according to the IP address and the subnet mask.

At block 304, the computer device searches for a device that accesses the wireless network and of which IP address is within the IP address range.

In an example, the computer device may obtain, through a PING asynchronism calling mode, the identification of the device that accesses the wireless local network and of which IP address is within the IP address range. The identification of the device may include the name or MAC address of the device.

At block 305, the computer device detects whether the device accessing the wireless network is a predefined security access device. If the device accessing the wireless network is not a predefined security access device, block 306 is performed. If the device accessing the wireless network is the predefined security access device, block 304 is performed.

In an example, the computer device may detect whether the device accessing the wireless local network is a predefined security access device after obtaining the identification of the device accessing the wireless local network.

At block 306, the computer device sends a security prompt message to the user.

In an implementation, the user may predefine a white list including devices that are certified to access the wireless local network. If a device that is not included in the white list accesses the wireless local network, the computer device sends the security prompt message to the user.

The method for monitoring the wireless network may be triggered automatically by the computer device, which is convenient for the user to monitor the wireless network and improves user experiences.

Figure 4:
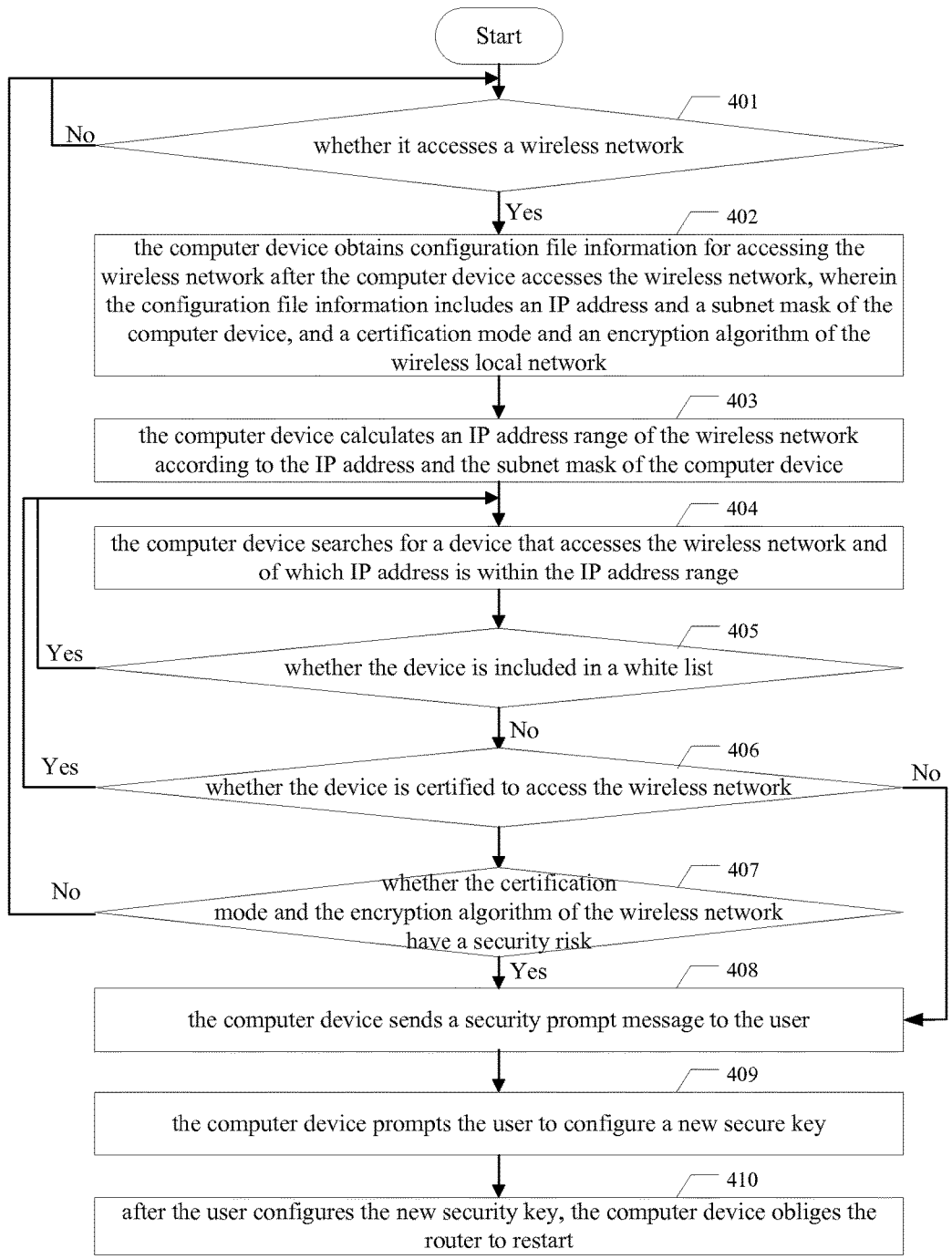
FIG. 4 is a schematic flowchart illustrating a method for monitoring a wireless network according to another example of the present disclosure.

The method for monitoring the wireless network is illustrated with reference to an application scenario. Referring to FIG. 4, the method for monitoring the wireless network includes following blocks.

At block 401, after starting, a computer device detects whether it accesses a wireless network. If the computer device accesses the wireless network, block 402 is performed. If the computer device does not access the wireless network, block 401 is performed.

In an example, the wireless network may be a wireless local network. For convenience, the wireless local network is taken as an example in the following description.

In an example, the computer device monitors a connection event and a disconnection event of the wireless local network. When the connection event is found, block 402 is performed.

At block 402, the computer device obtains configuration file information for accessing the wireless network after the computer device accesses the wireless network, wherein the configuration file information includes an IP address and a subnet mask of the computer device, and a certification mode and an encryption algorithm of the wireless local network.

After accessing the wireless local network, the computer device obtains the configuration file information according to a system wireless service.

At block 403, the computer device calculates an IP address range of the wireless network according to the IP address and the subnet mask of the computer device.

At block 404, the computer device searches for a device that accesses the wireless network and of which IP address is within the IP address range.

In an example, the computer device obtains the identity of the device that accesses the wireless network and of which IP address is within the IP address range.

At block 405, the computer device determines whether the device is included in a white list. If the device is included in the white list, and block 404 is performed. If the device is not included in the white list, block 406 is performed.

In an example, the computer device maintains the white list, which includes devices that are certified to access the wireless local network.

The computer device compares the obtained identification of the device with the identifications recorded in the white list, and determines whether the identification of the device is included in the white list. If the identification of the device is included in the white list, block 404 is performed. If the identification of the device is not included in the white list, block 406 is performed.

At block 406, the computer device detects whether the device is certified to access the wireless network. If the device is uncertified to access the wireless network, block 408 is performed. If the device is certified to access the wireless network, block 404 is performed.

In an example, the computer device may prompt the user to detect whether the device is certified to access the wireless local network.

At block 407, the computer device detects whether the certification mode and the encryption algorithm of the wireless network have a security risk. If the certification mode and the encryption algorithm of the wireless network have no security risk, block 401 is performed. If the certification mode and the encryption algorithm of the wireless network have a security risk, block 408 is performed.

At block 408, the computer device sends a security prompt message to the user.

In an example, if the certification mode and the encryption algorithm of the wireless local network are not secure enough, the computer device sends the security prompt message to the user through TIPS.

At block 409, the computer device prompts the user to configure a new secure key.

By the simplified method for configuring the security key provided according to the example of the present disclosure, the user does not need operate a complex router management page. The user may configure the security key with a higher security level as long as the user inputs a management account and a password of the router. Other configurations such as the selection of certification mode and the determination of key period may be performed automatically for the user.

At block 410, after the user configures the new security key, the computer device obliges the router to restart.

The router needs to be restarted to make the new security key effective. After the router restarts, the user needs to input the new security key to make the computer device access the wireless local network again.

After block 408, the method may further include that the user triggers an operation of scanning the devices accessing the wireless local network.

In an example, when the user finds that the transmission speed of the wireless local network is unstable or becomes slow, the user may initiatively trigger the operation of scanning the devices accessing the wireless local network, so as to obtain the information of the devices accessing the wireless local network. If an unknown new device accesses the wireless local network, the computer device may prompt the user to detect whether the device is uncertified to access the wireless network.

When monitoring and scanning the devices accessing the wireless local network, the computer device may obtain the name, the IP address, the MAC address and the history access times of a device through technical means. The user may determine according to the information whether the device is certified to access the wireless local network. If the device is certified to access the wireless local network, the device may be recorded into the white list. If the device is uncertified to access the wireless local network, the computer device sends a security prompt message to the user.

Figure 5:
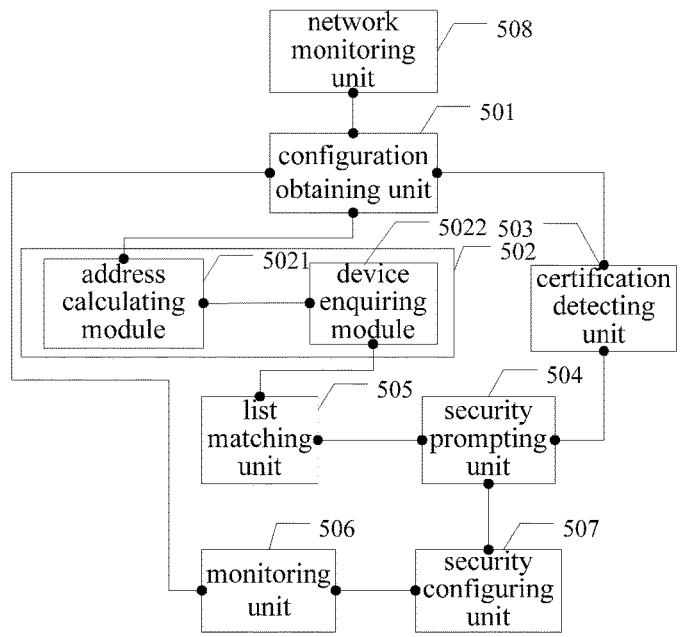
FIG. 5 is a schematic diagram illustrating the structure of a computer device for monitoring a wireless network according to an example of the present disclosure.

FIG. 5 is a schematic diagram illustrating the structure of a computer device for monitoring a wireless network according to an example of the present disclosure. As shown in FIG. 5, the computer device includes a configuration obtaining unit 501 and a device searching unit 502.

The configuration obtaining unit 501 is configured to obtain configuration file information for accessing a wireless local network after the computer device access the wireless local network. The configuration file information includes an IP address and a subnet mask of the computer device.

In an example, the wireless local network may be a wireless local network. For convenience, the wireless local network is taken as an example in the following description.

The device searching unit 502 includes:

an address calculating module 5021, configured to calculate an IP address range of the wireless local network according to the IP address and the subnet mask of the computer device; and a device enquiring module 5022, configured to enquire about the identification of a device that accesses the wireless local network and of which IP address is within the IP address range through a PING asynchronism calling mode.

The configuration file information further includes a certification mode and an encryption algorithm.

The computer device further includes a certification detecting unit 503, configured to detect whether the certification mode and the encryption algorithm have a security risk, and send an instruction to a security prompting unit 504 if the certification mode and the encryption algorithm have the security risk.

The security prompting unit 504 sends a security prompt message to the user after receiving the instruction from the certification detecting unit 503.

The computer device further includes a list matching unit 505, configured to detect whether the device that accesses the wireless local network is a predefined security access device, and send an instruction to the security prompting unit 504 if the device that accesses the wireless local network is the predefined security access device.

The security prompting unit 504 sends a security prompt message to the user after receiving the instruction from the list matching unit 505.

The computer device further includes a monitoring unit 506, configured to monitor whether a new device access the wireless local network. If a new device accesses the wireless local network, the monitoring unit 506 detects whether the new device is a predefined security access device. If the new device is not the predefined security access device, the monitoring unit 506 sends an instruction to the security prompting unit 504.

The security prompting unit 504 sends a security prompt message to the user after receiving the instruction from the monitoring unit 506.

The computer device further includes a security configuring unit 507, the security configuring unit 507 pushes a security configuring interface to the user, so that the user reconfigures a wireless access password on the security configuring interface. The security configuring unit 507 selects a new certification mode and a new encryption algorithm for the user.

The computer device further includes a network monitoring unit 508, configured to monitor a network state of the wireless local network. When the transmission speed of the wireless local network is unstable or is lower than a predefined threshold, the network monitoring unit 508 sends an instruction to the configuration obtaining unit 501.

The security prompting unit 504 sends a security prompt message to the user after receiving the instruction from the network monitoring unit 508.

In an implementation, the computer device may obtain configuration file information corresponding to a local network card after accessing the wireless local network. The configuration file information includes necessary configuration parameters for accessing the wireless local network by the computer device. The configuration file information usually includes the IP address and the subnet mask of the computer device, the name, the certification mode, the encryption algorithm, the gateway address and the signal strength of the wireless local network. The physical address of the local network card, the IP address and the subnet mask are corresponding to each other.

The identification of the device may include the name or MAC address of the device.

In an implementation, the user may predefine a white list including devices that are certified to access the wireless local network. If a device that is not included in the white list accesses the wireless local network, the security prompting unit 504 sends a security prompt message to the user.

In an example, after the configuration obtaining unit 501 obtains the configuration file information, the certification detecting unit 503 detects whether the certification mode and the encryption algorithm of the wireless network have a security risk, and sends an instruction to the security prompting unit 504. In an example, the security prompt message may be a TIPS message.

The security prompting unit 504 sends a security prompt message to the user after receiving the instruction from the certification detecting unit 503.

In an example, the computer device may configure a blacklist according to conventional certification modes and encryption algorithms. If the certification mode and the encryption algorithm of the wireless local network are in the blacklist, the security prompting unit 504 may send the security prompt message to the user.

The computer device may monitor the wireless local network. In an example, the monitoring unit 506 monitors device access state of the wireless local network. If a new device accesses the wireless local network, the monitoring unit 506 detects whether the new device is a predefined security access device. Before detecting whether the new device is the predefined security access device, the computer device obtains the identification of the new device firstly. If no new device accesses the wireless local network, the monitoring unit 506 sends an instruction to the security prompting unit 504.

The security prompting unit 504 sends a security prompt message to the user after receiving the instruction from the monitoring unit 506.

After receiving the security prompt message, the user may reconfigure a wireless access password, and modifies the certification mode and the encryption algorithm. In an example, the user may manually select a new certification mode and a new encryption algorithm, or the computer device automatically selects the new certification mode and the new encryption algorithm for the user.

The security configuring unit 507 may push a security configuring interface to the user, so that the user reconfigures the wireless access password on the security configuring interface. According to the wireless access password configured by the user, the security configuring unit 507 may select the new certification mode and the new encryption algorithm for the user.

When determining that the certification mode and the encryption algorithm of the wireless local network have a security risk, the computer device prompts the user through the security prompt message to reconfigure a secure certification mode. During a conventional router configuration operation process, the user needs to log on a router manage page through a browser, find an encryption configuration option of wireless local network from various management contents and configure a security key in the encryption configuration option. These operations are too complex for a common user. An example of the present disclosure provides a simplified method for configuring the security key. In the method, a simple configuring interface is presented to the user. As long as the user inputs a management account and a password of the router, the user may configure the security key on a subsequent page. In an example, the computer device may determine whether the security key inputted by the user is complex enough. If the security key is not complex enough, the computer device prompts the user to input a more complex security key, and automatically selects a certification mode with a higher security level for the user, such as the WPA2-PSK and the AES. After the configuration, the computer device automatically obliges the router to restart, and prompts the user to access the wireless local network with the new security key.

Figure 6:
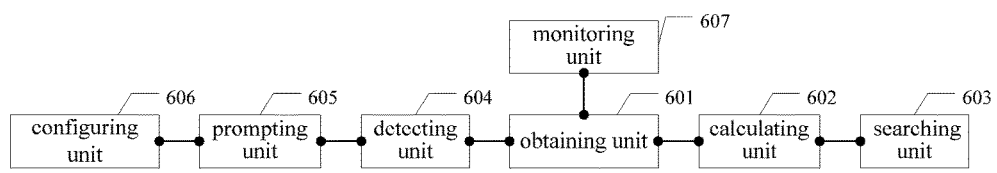
FIG. 6 is a schematic diagram illustrating the structure of a computer device for monitoring a wireless network according to another example of the present disclosure.

FIG. 6 is a schematic diagram illustrating the structure of a computer device for monitoring a wireless network according to another example of the present disclosure. The computer device includes an obtaining unit 601, a calculating unit 602 and a searching unit 603.

The obtaining unit 601 is configured to obtain configuration file information for accessing the wireless network after the computer device accesses the wireless network, wherein the configuration file information includes an IP address and a subnet mask of the computer device.

The calculating unit 602 is configured to calculate an IP address range of the wireless network according to the IP address and the subnet mask of the computer device.

The searching unit 603 is configure to search for a device that accesses the wireless network and of which IP address is within the IP address range.

In an example, the configuration file information further includes a certification mode and an encryption algorithm of the wireless network, and the computer device further includes a detecting unit 604 and a prompting unit 605.

The detecting unit 604 is configured to detect whether the certification mode and the encryption algorithm of the wireless network have a security risk, and send an instruction to the prompting unit 605 if the certification mode and the encryption algorithm of the wireless network have the security risk.

The prompting unit 605 is configured to send a security prompt message to a user after receiving the instruction from the detecting unit 604.

In an example, the detecting unit 604 is configured to detect whether the device that accesses the wireless network and of which IP address is within the IP address range is a predefined security access device, and send an instruction to the prompting unit 605 if the device that accesses the wireless network and of which IP address is within the IP address range is the predefined security access device.

The prompting unit 605 is configured to send a security prompt message to a user after receiving the instruction from the detecting unit 604.

In an example, the computer device further includes a configuring unit 606.

The configuring unit 606 is configured to push a security configuring interface to the user, wherein the user reconfigures a wireless access password on the security configuring interface. The configuring unit 606 is further configured to select a new certification mode and a new encryption algorithm for the user according to the wireless access password configured by the user.

In an example, the computer device further includes a monitoring unit 607.

The monitoring unit 607 is configured to monitor a network state of the wireless network. The obtaining unit 601 is configured to, when the transmission speed of the wireless network is unstable or is lower than a predefined threshold, obtain the configuration file information for accessing the wireless network.

In an example, the obtaining unit is further configured to obtain, through a PING asynchronism calling mode, an identification of the device that accesses the wireless local network and of which IP address is within the IP address range after the searching module finds the device that accesses the wireless local network and of which IP address is within the IP address range; and present the identification of the device to a user, wherein the user determines, according to the identification of the device, whether the device is not certified to access the wireless local network.

In an example, the computer device further includes a blacklist configuring unit, configured to configure a blacklist according to conventional certification modes and encryption algorithms. At this case, the detecting unit is configured to detect whether the certification mode and the encryption algorithm of the wireless local network are in the blacklist, determine that the certification mode and the encryption algorithm of the wireless network have the security risk if the certification mode and the encryption algorithm of the wireless local network are in the blacklist, and send the instruction to the prompting unit. The prompting unit is configured to send the security prompt message to the user.

Figure 7:
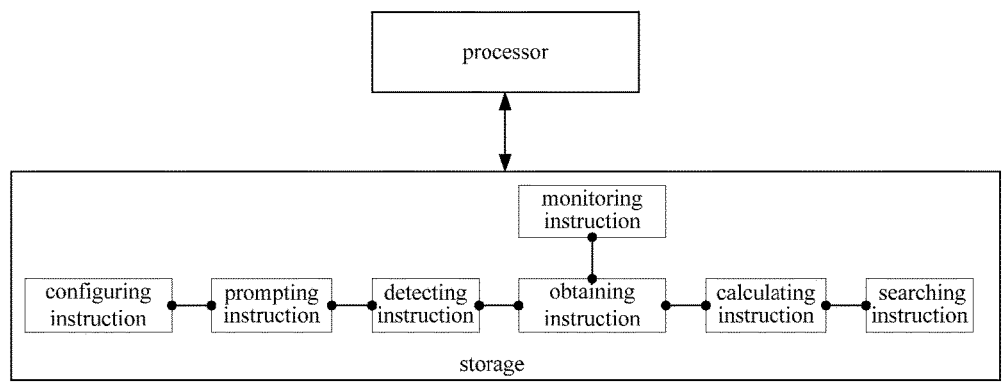
FIG. 7 is a schematic diagram illustrating the structure of a computer device for monitoring a wireless network according to another example of the present disclosure.

FIG. 7 is a schematic diagram illustrating the structure of a computer device for monitoring a wireless network according to another example of the present disclosure. As shown in FIG. 7, the computer device for monitoring a wireless network at least includes a storage and a processor communicating with the storage, in which the storage includes an obtaining instruction, a calculating instruction and a searching instruction that can be executed by the processor. The storage may be a non-transitory computer readable storage medium and the obtaining instruction, the calculating instruction and the searching instruction may be machine readable instructions stored in the storage. The processor may also execute the machine readable instructions stored in the storage.

The obtaining instruction may obtain configuration file information for accessing the wireless network after the computer device accesses the wireless network, wherein the configuration file information includes an IP address and a subnet mask of the computer device.

The calculating instruction may calculate an IP address range of the wireless network according to the IP address and the subnet mask of the computer device.

The searching instruction may search for a device that accesses the wireless network and of which IP address is within the IP address range.

In an example, the configuration file information further includes a certification mode and an encryption algorithm of the wireless network, and the computer device further includes a detecting instruction and a prompting instruction.

In an example, the detecting instruction may detect whether the certification mode and the encryption algorithm of the wireless network have a security risk, and send an instruction to the prompting instruction if the certification mode and the encryption algorithm of the wireless network have the security risk. The prompting instruction may send a security prompt message to a user after receiving the instruction from the detecting instruction.

In an example, the detecting instruction may detect whether the device that accesses the wireless network and of which IP address is within the IP address range is a predefined security access device, and send an instruction to the prompting instruction if the device that accesses the wireless network and of which IP address is within the IP address range is the predefined security access device. The prompting instruction may send a security prompt message to a user after receiving the instruction from the detecting instruction.

In an example, the computer device further includes a configuring instruction. The configuring instruction may push a security configuring interface to the user, wherein the user reconfigures a wireless access password on the security configuring interface; and select a new certification mode and a new encryption algorithm for the user according to the wireless access password configured by the user.

In an example, the computer device further includes a monitoring instruction. The monitoring instruction may monitor a network state of the wireless network. When the transmission speed of the wireless network is unstable or is lower than a predefined threshold, the obtaining instruction may obtain the configuration file information for accessing the wireless network.

In an example, the obtaining instruction may be further configured to obtain, through a PING asynchronism calling mode, an identification of the device that accesses the wireless local network and of which IP address is within the IP address range after the searching module finds the device that accesses the wireless local network and of which IP address is within the IP address range; and present the identification of the device to a user, wherein the user determines, according to the identification of the device, whether the device is not certified to access the wireless local network.

In an example, the computer device may further include a blacklist configuring instruction, configured to configure a blacklist according to conventional certification modes and encryption algorithms. At this case, the detecting instruction is configured to detect whether the certification mode and the encryption algorithm of the wireless local network are in the blacklist, determine that the certification mode and the encryption algorithm of the wireless network have the security risk if the certification mode and the encryption algorithm of the wireless local network are in the blacklist, and send the instruction to the prompting instruction. The prompting instruction is configured to send the security prompt message to the user.

It should be understood that the method and computer device provided by the examples of the present disclosure may be implemented through other modes. For example, the above mentioned computer device is only a schematic example. It is according to logic functions that the computer device is divided into the above mentioned units. The computer device may also be divided into other units in an actual application. For example, some units or components may be combined or may be integrated into another system, or some features may be omitted or are not performed. Devices or units may be coupled or connected directly or through some interfaces. Moreover, the devices or units may be coupled or connected electrically or mechanically or in other forms.

The units provided in the examples of the present disclosure may be integrated into one unit or may be separated. Or, two or more units may be integrated into on unit. The integrated unit may be implemented by hardware or software.

If the units are implemented by software and are sold or used as a separated product, the units may be saved in a computer readable medium. That is, the instructions saved in the computer readable medium may make a computer device execute all or part of steps of the method provided by the examples of the present disclosure. The computer device may be a server or a network device. The computer readable medium may be any medium that may save program codes, such as a USB, a mobile disk, a Read-Only Memory (ROM), a Random Access Memory (RAM), a diskette and a CD.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for monitoring a wireless network, comprising:

obtaining, by a computer device, configuration file information for accessing the wireless network after the computer device accesses the wireless network, wherein the configuration file information comprises an Internet Protocol (IP) address and a subnet mask of the computer device;

calculating, by the computer device, an IP address range of the wireless network according to the IP address and the subnet mask of the computer device; and searching for, by the computer device, a device that accesses the wireless network and of which IP address is within the IP address range;

finding, by the computer device, a device that accesses the wireless network and of which the IP address is within the IP address range;

obtaining by the computer device, an identification of the device that accesses the wireless network and of which the IP address is within the IP address range;

presenting the identification of the device to a user, wherein the user determines, according to the identification of the device, whether the device is not certified to access the wireless network.

2. The method of claim 1, wherein the configuration file information further comprises a certification mode and an encryption algorithm of the wireless network; and after obtaining the configuration file information for accessing the wireless network, the method further comprises:

detecting, by the computer device, whether the certification mode and the encryption algorithm of the wireless network have a security risk, and sending a security prompt message to a user if the certification mode and the encryption algorithm of the wireless network have the security risk.

3. The method of claim 2, after sending the security prompt message to the user, further comprising:

pushing, by the computer device, a security configuring interface to the user, wherein the user reconfigures a wireless access password on the security configuring interface; and selecting, by the computer device, a new certification mode and a new encryption algorithm for the user according to the wireless access password configured by the user.

4. The method of claim 2, further comprising:

configuring, by the computer device, a blacklist, wherein the detecting, by the computer device, whether the certification mode and the encryption algorithm of the wireless network have the security risk, and sending the security prompt message to the user if the certification mode and the encryption algorithm of the wireless network have the security risk comprises:

detecting, by the computer device, whether the certification mode and the encryption algorithm of the wireless local network are in the blacklist, determining that the certification mode and the encryption algorithm of the wireless network have the security risk if the certification mode and the encryption algorithm of the wireless local network are in the blacklist, and sending the security prompt message to the user.

5. The method of claim 1, after finding the device that accesses the wireless network and of which IP address is within the IP address range, further comprising:

detecting whether the device that accesses the wireless network and of which IP address is within the IP address range is a predefined security access device, and sending a security prompt message to a user if the device that accesses the wireless network and of which IP address is within the IP address range is the predefined security access device.

6. The method of claim 1, before obtaining the configuration file information for accessing the wireless network, further comprising:

monitoring a network state of the wireless network; wherein the obtaining the configuration file information for accessing the wireless network comprises:

when the transmission speed of the wireless network is unstable or is lower than a predefined threshold, obtaining the configuration file information for accessing the wireless network.

7. The method of claim 1, further comprising:

obtaining the identification of the device, by the computer device through a PING asynchronism calling mode.

8. A computer device for monitoring a wireless network, comprising:

an obtaining unit, configured to obtain configuration file information for accessing the wireless network after the computer device accesses the wireless network, wherein the configuration file information comprises an Internet Protocol (IP) address and a subnet mask of the computer device;

a calculating unit, configured to calculate an IP address range of the wireless network according to the IP address and the subnet mask of the computer device; and a searching unit, configured to search for a device that accesses the wireless network and of which IP address is within the IP address range;

wherein the obtaining unit is further configured to obtain an identification of a device that accesses the wireless network and of which the IP address is within the IP address range after the searching unit finds such a device; and wherein the obtaining unit is further configured to present the identification of the device to a user, wherein the user determines, according to the identification of the device, whether the device is not certified to access the wireless network.

9. The computer device of claim 8, wherein the configuration file information further comprises a certification mode and an encryption algorithm of the wireless network, and the computer device further comprises a detecting unit and a prompting unit, wherein the detecting unit is configured to detect whether the certification mode and the encryption algorithm of the wireless network have a security risk, and send an instruction to the prompting unit if the certification mode and the encryption algorithm of the wireless network have the security risk; and the prompting unit is configured to send a security prompt message to a user after receiving the instruction from the detecting unit.

10. The computer device of claim 9, further comprising:

a configuring unit, configured to push a security configuring interface to the user, wherein the user reconfigures a wireless access password on the security configuring interface; and select a new certification mode and a new encryption algorithm for the user according to the wireless access password configured by the user.

11. The computer device of claim 9, further comprising:
a blacklist configuring unit, configured to configure a blacklist, wherein the detecting unit is configured to detect whether the certification mode and the
encryption algorithm of the wireless local network are in the blacklist, determine that the certification mode and the encryption algorithm of the wireless network have the security risk if the certification mode and the encryption algorithm of the wireless local network are in the blacklist, and send the instruction to the prompting unit; and
the prompting unit is configured to send the security prompt message to the user.

12. The computer device of claim 8, further comprising a detecting unit and a prompting unit, wherein
the detecting unit is configured to detect whether the device that accesses the wireless network and of which IP address is within the IP address range is a predefined security access device, and send an instruction to the prompting unit if the device that accesses the wireless network and of which IP address is within the IP address range is the predefined security access device; and
the prompting unit is configured to send a security prompt message to a user after receiving the instruction from the detecting unit.

13. The computer device of claim 8, further comprising:
a monitoring unit, configured to monitor a network state of the wireless network; wherein
the obtaining unit is configured to, when the transmission speed of the wireless network is unstable or is lower than a predefined threshold, obtain the configuration file information for accessing the wireless network.

14. The computer device of claim 8, wherein the obtaining unit is further configured to obtain the identification through a ping asynchronism calling mode.

* * * * *